United States Patent [19]

Wang et al.

[11] Patent Number: 5,716,304
[45] Date of Patent: Feb. 10, 1998

[54] ELLIPTICAL FRAME STRUCTURE FOR EXERCISE BIKES

[75] Inventors: Leao Wang; Peter Wu, both of Taichung Hsien, Taiwan

[73] Assignee: Greenmaster Industrial Corp., Taichung Hsien, Taiwan

[21] Appl. No.: 647,458

[22] Filed: May 7, 1996

[51] Int. Cl.⁶ .................................................. A63B 21/00
[52] U.S. Cl. ............................ 482/57; D21/194; 280/781
[58] Field of Search ................................. 482/51, 57, 148, 482/142; D21/194; 280/200, 781; 29/428, 521; 428/582, 596

[56] References Cited

U.S. PATENT DOCUMENTS

D. 275,589  9/1984  Gustafsson ........................... D21/194
3,596,921  8/1971  Bruckl ................................. 273/73 C
3,809,402  5/1974  Haines et al. ...................... 273/73 C
5,046,723  9/1991  Szymski et al. ....................... 482/57

*Primary Examiner*—Stephen R. Crow
*Attorney, Agent, or Firm*—Bacon & Thomas

[57] ABSTRACT

A frame structure for exercise bikes consisting of a plurality of generally tubes for constituting a main frame or seat post of the exercise bike. Each elliptical tube includes two planar walls arranged in a parallel manner with their lateral sides joined by two curved walls to form an elliptical, tubular structure with curved sides. The elliptical frame structure has good structural strength and smooth surfaces to ensure safety. It also simplifies and facilitates assembly, and enlarges contact surfaces between tubes thereby reinforcing the connections.

1 Claim, 2 Drawing Sheets

ELLIPTICAL FRAME STRUCTURE FOR EXERCISE BIKES

BACKGROUND OF THE INVENTION (a) Field of the Invention

The present invention relates generally to an exercise bike, and more particularly to an elliptical frame structure for forming a frame of the exercise bike to achieve good structural strength, and easy mounting as well as to provide safety to the exercise bike.

(b) Description of the Prior Art

In the prior art, the frame of the exercise bike is constituted by rectangular or circular tubes welded together. With reference to FIG. 1, a rectangular tube 10 has an oblique plane 11 at a bottom end thereof. The rectangular tube 10 is joined to a side wall 13 of another rectangular tube 12 via the oblique plane 11 by welding. The frame thus formed may be used as the main frame or the seat post of the exercise bike. Although such rectangular tubes inherently have suitable strength, as the side walls of the rectangular tubes are joined at an angle of 90 degrees, they have four sharp corners. A user may accidentally bump against and be hurt by the sharp corners. FIG. 2 shows another conventional structure of tubes for exercise bikes. A circular tube 20 has a curved securing plate 21 prewelded to a bottom end thereof. The circular tube 20 is then welded or locked to another circular tube 22 by means of the securing plate 21. Although circular tubes do not have sharp angles or corners, the need for a securing plate for connection purposes complicates the assembling process. Besides, circular tubes have a less structural strength than rectangular tubes.

SUMMARY OF THE INVENTION

Accordingly, a primary object of the present invention is to provide an elliptical frame structure for exercise bikes wherein a plurality of elliptical tubes having smooth curves are directly interconnected by welding to form a main frame having a tube for receiving a seat post, the elliptical tube comprising two parallel planar surfaces, two curved walls joined to the lateral sides of the planar surfaces such that they together form an elliptical tube with curved sides, thereby constituting a frame structure of good structural strength and safety.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
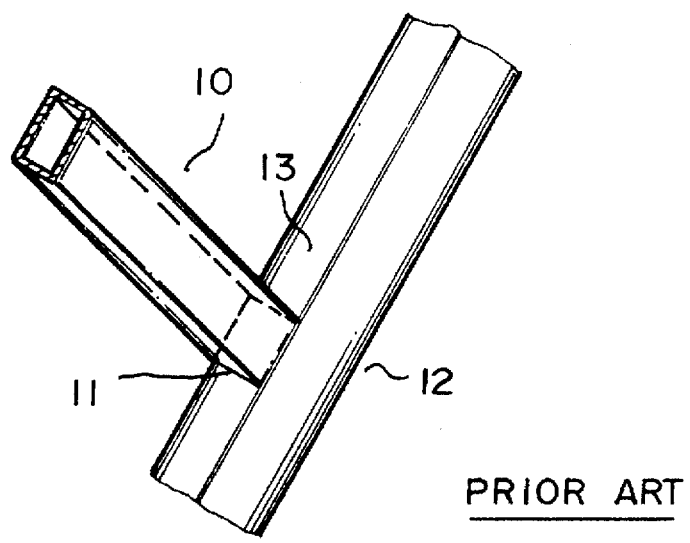
FIG. 1 is an elevational, schematic view of a prior rectangular tube.
Figure 2:
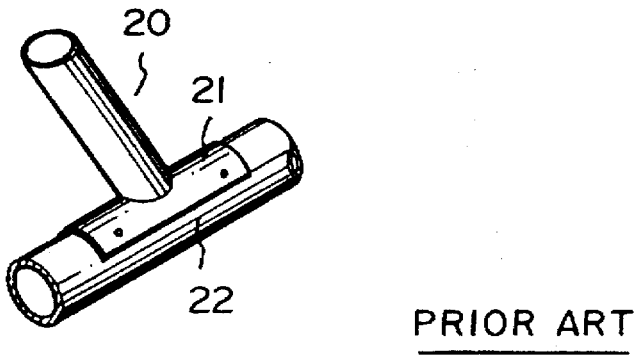
FIG. 2 is an elevational, schematic view of a prior circular tube.
Figure 3:
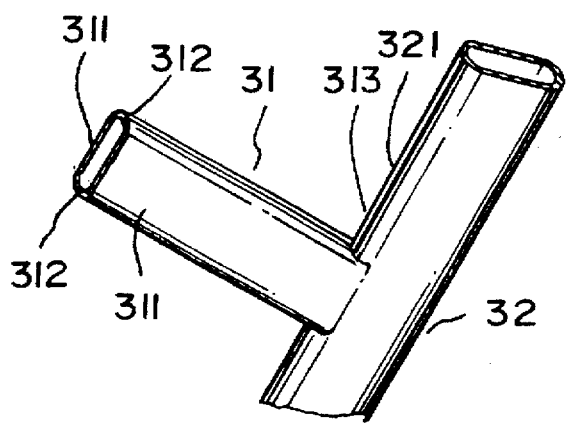
FIG. 3 is an elevational, schematic view of a preferred embodiment of an elliptical frame of the present invention.
Figure 4:
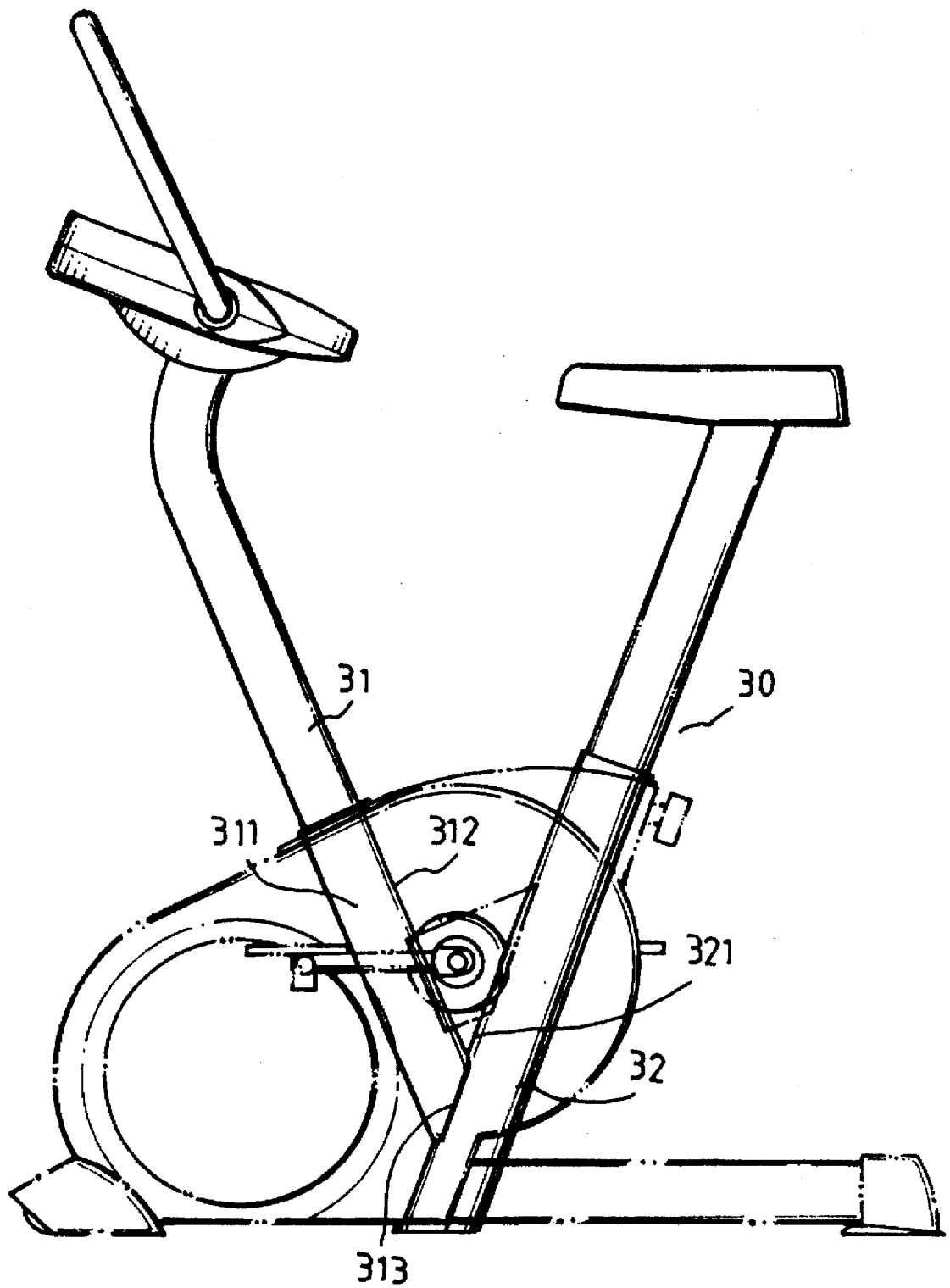
FIG. 4 is an elevational, schematic view showing the elliptical tubes used in an exercise bike.

With reference to FIGS. 3 and 4 showing a preferred embodiment of the frame structure of the invention, a frame structure 30 consists of a plurality of elliptical tubes welded together to constitute a main frame having a tube for receiving a seat post of the exercise bike. An elliptical tube 31 has a generally elliptical-shaped transverse cross-sectional configuration defined by two substantially planar walls 311 arranged face-to-face in a parallel manner, two curved walls 312 each of which is disposed between the planar walls 312 for joining the lateral sides of the planar walls 312 to form a generally shape. In assembly, one has an edge portion of each curved wall cut so that the cut so that the cut edge portions collectively form a recessed curved portion 313 which has a curvature matching that of a curved wall 321 of an elliptical tube 32 to be joined thereto. The curved portion 313 of the elliptical tube 31 is arranged to fit onto the curved wall 321 of the elliptical tube 32 and is fixedly connected thereto by welding.

It can therefore be seen that the elliptical tubes according to the present invention have the advantage of good structural strength like rectangular tubes and smooth curved surfaces like circular tubes, but without sharp angular corners or the need for securing pieces. On the other hand, the joining of two elliptical tubes is simplified and facilitated by arrangement of curved walls and curved portions. Furthermore, contact surfaces between two elliptical tubes are enlarged to reinforce the connection.

Although the present invention has been illustrated and described with reference to the preferred embodiment thereof, it should be understood that it is in no way limited to the details of such embodiment but is capable of numerous modifications within the scope of the appended claims.

What is claimed is:

1. A frame structure for an exercise bike comprising a plurality of tubes in which at least two tubes are secured together to form a main frame having a seat post tube, the improvement comprising each tube having a generally elliptical-shaped transverse cross-sectional configuration defined by a pair of spaced parallel planer walls joined at opposite ends thereof by a pair of spaced curved walls, at least one end of one tube having an edge portion of each curved wall cut whereby the cut edge portions collectively form a recessed curved portion having a curvature corresponding to the curvature of a curved wall and the recessed curved portion of the one tube being disposed in conforming engagement with and welded to the curved wall of another tube.

* * * * *